United States Patent [19]

MacKendrick et al.

[11] 4,186,826
[45] Feb. 5, 1980

[54] TORQUE LIMITING CLUTCH BRAKE

[75] Inventors: William J. MacKendrick, Syracuse; Harold F. Brown, Skaneateles, both of N.Y.

[73] Assignee: Lipe-Rollway Corporation, Syracuse, N.Y.

[21] Appl. No.: 876,674

[22] Filed: Feb. 10, 1978

[51] Int. Cl.² .............................................. F16D 67/02
[52] U.S. Cl. .............................. 192/13 R; 192/107 C; 188/218 XL
[58] Field of Search ............... 192/13 R, 18 R, 107 C; 188/73.2, 218 XL

[56] References Cited

U.S. PATENT DOCUMENTS

| 3,763,977 | 10/1973 | Sink | 192/13 R |
|---|---|---|---|
| 4,014,420 | 3/1977 | Riese | 192/13 R |
| 4,043,437 | 8/1977 | Taylor | 192/13 R |

Primary Examiner—Benjamin Wyche
Attorney, Agent, or Firm—Bruns & Jenney

[57] ABSTRACT

A clutch brake unit suitable for use in conjunction with a heavy duty clutch assembly for retarding the motion of the driven clutch shaft. The unit is actuated by the clutch release mechanism which causes the unit to be compressed between a movable member and a stationary member as the clutch is being released. A pair of discs, adapted to positively engage the shaft in sliding relationship therewith, are initially engaged by the members in friction driving contact and forced together against the biasing pressure of a wave washer mounted therebetween. The discs are independently mounted for compression within a relatively rigid housing. When the discs are compressed to a predetermined depth, the two members engage the housing thereby preventing further loading of the shaft.

6 Claims, 4 Drawing Figures

TORQUE LIMITING CLUTCH BRAKE

BACKGROUND OF THE INVENTION

This invention relates generally to an improved clutch brake unit for use in conjunction with a clutch assembly for retarding the motion of the driven clutch shaft when the clutch is released and which, more importantly, limits the amount of torque that can be applied to the shaft through the unit.

Clutch brake units for use in clutch assemblies and, in particular, heavy duty clutch assemblies, are well known in the art. In practice, the clutch brake is designed to be actuated through the clutch pedal mechanism of the vehicle. Typically, upon depressing the pedal, the clutch is disengaged thereby releasing the driven shaft that is operatively connected to the transmission. As a consequence, the shaft ordinarily will continue to rotate at relatively high speeds, or at least at speeds which make the shifting of gears difficult. The clutch brake is usually actuated by further depressing the clutch pedal which, in turn, causes a braking torque to be applied to the driven shaft to retard or stop its motion.

Conventionally, the clutch brake unit is keyed or splined to the shaft and the braking load transmitted through a friction coupling that is designed to limit the load that can be applied to the shaft. The friction coupling thus provides a safety feature which considerably reduces the possibility of damaging the brake linkage. One such unit is disclosed by Sink in U.S. Pat. No. 3,763,977 wherein a pair of Belleville washers are utilized in the friction coupling as the load limiting components in the system. As such, the washers form an integral part of the torque transmitting linkage and are thus subjected to excessive wear which can lead to premature failure of the unit.

SUMMARY OF THE INVENTION

It is therefore an object of the present invention to improve clutch brake units used in conjunction with clutch assemblies.

A further object of the present invention is to prevent overloading of a clutch brake unit by transmitting all excessive braking forces applied thereto rapidly and efficiently out of the system.

Another object of the present invention is to provide a reliable quick acting clutch brake unit that is efficient in operation and extremely rugged in construction.

These and other objects of the invention are attained by means of a clutch brake unit for use in conjunction with a clutch assembly wherein the unit is engaged between a moving member and a stationary member as the clutch is being released, the unit including a relatively rigid outer housing in which is independently mounted two disc members arranged to turn with the driven shaft of the clutch assembly and which can be moved axially toward or away from each other within the confines of the housing. The discs are biased outwardly by means of a wave washer so that the discs are initially compressed between the two members as the clutch is being disengaged or released whereupon the discs deliver a braking load to the shaft to retard its motion. When a predetermined load is applied to the discs, the discs are compressed into the housing, and the members lock against the housing to prevent further loading of the shaft and possible damage to the unit.

BRIEF DESCRIPTION OF THE DRAWINGS

For a better understanding of these and other objects of the present invention, reference is had to the following detailed description of the invention to be read in conjunction with the following drawings wherein.

DESCRIPTION OF THE INVENTION

Figure 1:
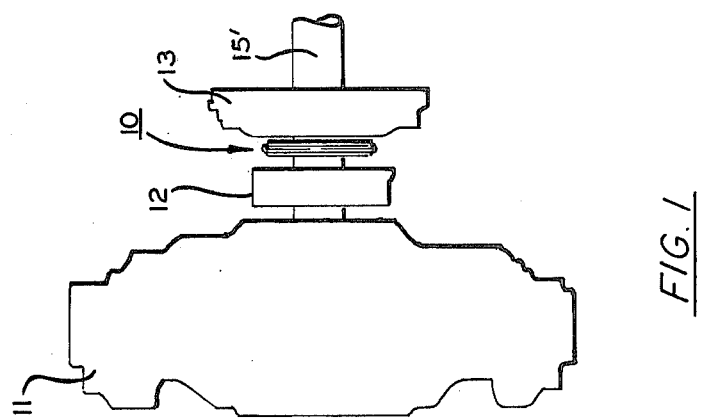
FIG. 1 is a schematic drawing showing the clutch brake unit positioned in a clutch assembly between a movable and a stationary member thereof.

Referring now to the drawings, a clutch brake unit 10 is disclosed suitable for use in an otherwise conventional friction clutch assembly 11 as described by Root in U.S. Pat. No. 3,179,217. Accordingly, reference may be had to the subject Root patent for a detailed explanation of the structure and function of the clutch mechanism and its associated components. The clutch assembly includes a release mechanism having a movable member 12 that is arranged to actuate the clutch brake unit. As will be explained in greater detail below, the unit is keyed to but axially movable upon the driven shaft 15 of the clutch assembly. When the clutch is released or disengaged the clutch brake unit is engaged by the release mechanism 12 and moved into engaging contact with an adjacent stationary member 13, which typically is a surface upon the transmission housing of the vehicle. The force exerted by the two coacting members is translated through the unit to the shaft thus retarding its motion.

Figure 2:
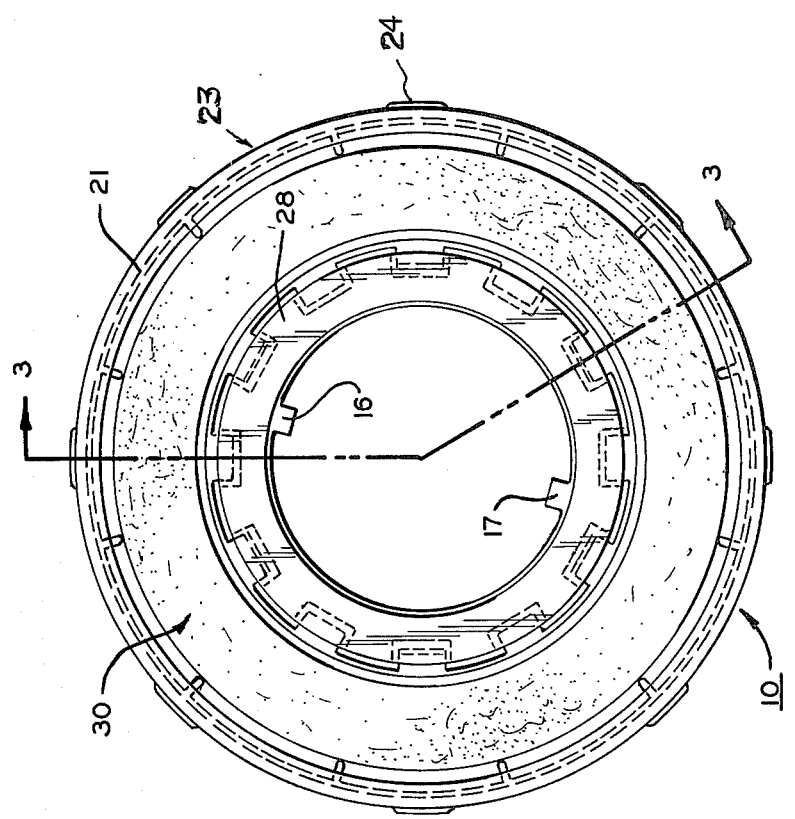
FIG. 2 is an enlarged plan view of the clutch brake unit shown in FIG. 1 illustrating further features thereof.
Figure 3:
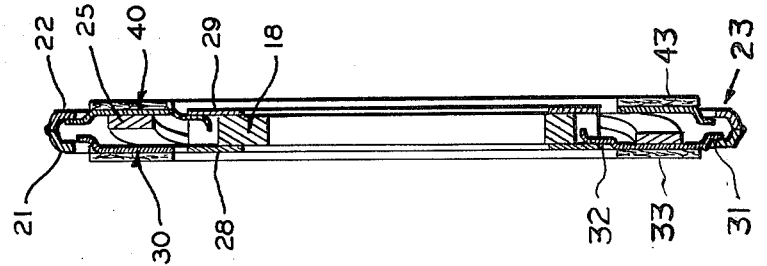
FIG. 3 is a sectional view taken along lines 3—3 in FIG. 2.
Figure 4:
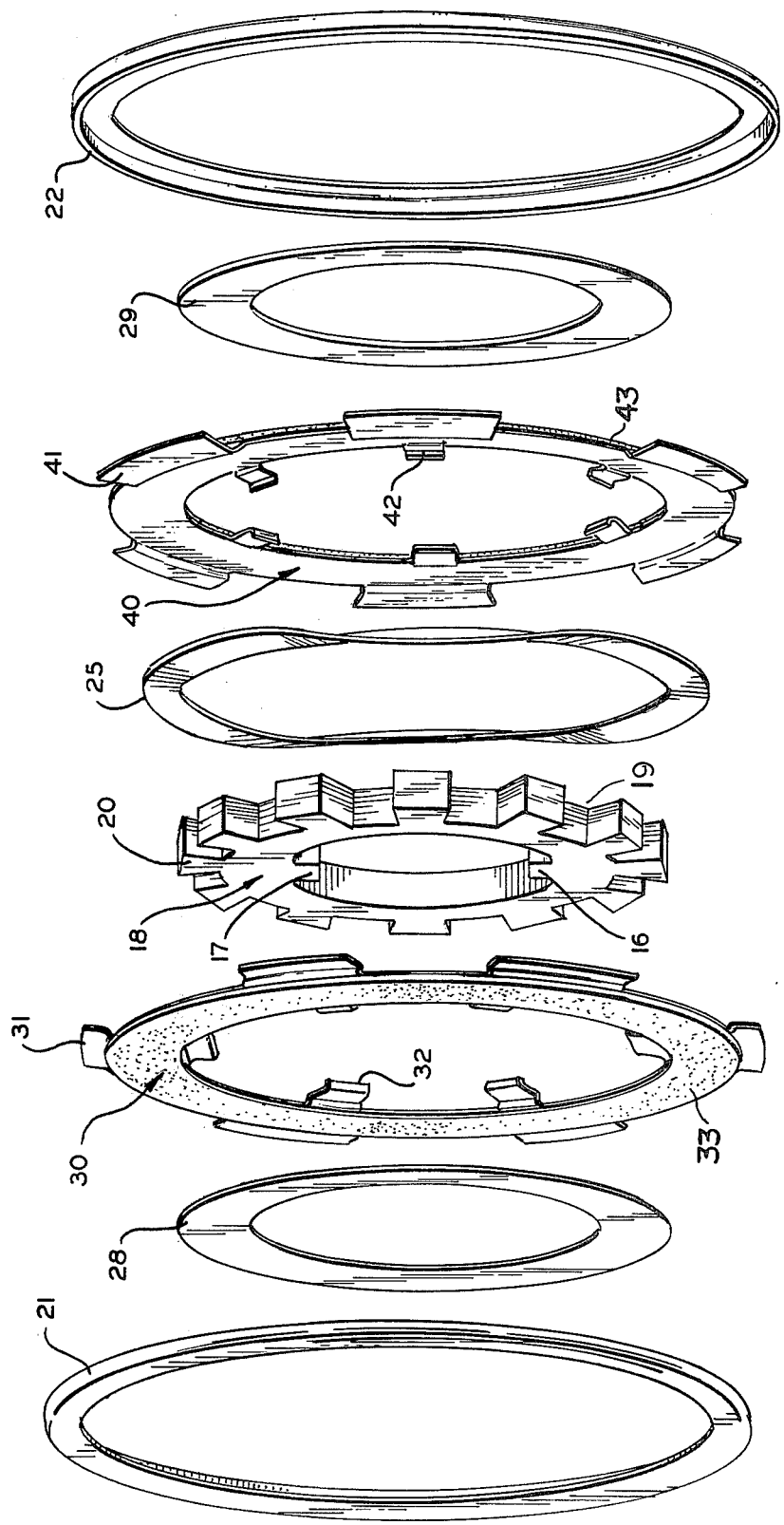
FIG. 4 is a further enlarged exploded view of the clutch brake shown in FIG. 2 illustrating the various components thereof.

The clutch brake of the present invention is generally contained within an outer rim or housing, generally referenced 23 (FIGS. 2 and 3). The housing is fabricated of two annular dish-like elements 21 and 22 that are joined together in assembly, as for example by welds 24, to establish a relatively strong, rigid outer structure for the unit. Positioned within the housing is a central hug 18 having two opposed internal tangs 16,17 being arranged to engage complimentary internal splines formed in the driven shaft of the clutch assembly. As a result of this arrangement, the hub is able to positively engage the shaft for rotation therewith while at the same time it is free to be moved axially along the shaft. The outer periphery of the hub is furnished with a plurality of radially extended teeth 20 equally spaced about the circumference thereof.

Over the hub is passed two annular discs 30 and 40 of similar construction. The central opening passing through each of the discs has depending inwardly therefrom a number of radial lugs 32 and 42 respectively. The lugs are slidably received within openings 19 formed between the teeth carried by the hub. In assembly, the lugs of one disc unit will be received in every second opening in the hub while the lugs of the other disc unit are similarly positioned therebetween as illustrated in FIG. 2. Accordingly, the discs are locked to the hub for rotation therewith but are provided freedom to move axially in assembly.

With the discs mounted upon the hub, a pair of cylindrical end plates 28,29 are spot welded, or otherwise joined, to the two end faces of the hub in axial alignment therewith. The outer diameter of the end plates is approximately that of the hub as measured over the teeth so that the end plates prevent the lugs of the two discs from passing outwardly beyond the side margins of the hub.

Also located along the outer periphery of the two discs 30 and 40 are outwardly extended radial tabs 31 and 41, respectively. In assembly, when the discs are mounted upon the hub, the tabs of the two members dovetail into each other as best seen in FIG. 2. A wave washer 25 is slipped over the hub in assembly. The internal opening of the washer provides sufficient clearance to accommodate the hub therein. In operation, the washer applies a biasing force against the two inner walls of the discs to urge the discs outwardly in an axial direction.

As best seen in FIG. 3, the radial extended tabs of the discs pass upwardly into the rim-like housing 23. Under the influence of the wave washer, the tabs are normally biased into contact against the inner wall of the housing as shown. This, in turn, limits the extent of axial movement provided to the discs and thus serves to maintain the discs at a desired spacing under normal or no-load conditions. In practice, the wave washer is formed to exert a predetermined load against the disc. The outer face of each disc supports thereon friction pads 33,43. In assembly, the pads extend outwardly from the housing on either side thereof so that the pads initially engage the two coacting members 12 and 13 in friction contact therewith when the clutch is released. Preferably the pads are formed of a material having the desired frictional characteristics for translating the force exerted by the members through the clutch brake components to the shaft 15. The pads are securely bonded to the outer end faces of the discs using any suitable bonding means.

As the clutch pedal is depressed to release the clutch, movable member 12 (FIG. 1) is moved back along shaft 15 and comes in contact with the clutch brake unit 10. Further movement of member 12 causes the unit to be forced into engagement with stationary member 13 whereupon a compressive force is delivered by the member against the pads. This force, acting through the discs and the hub serves to slow down or retard the movement of the shaft. Application of greater force against the pads produces a rearward movement of the discs into the housing against the biasing pressure of the washer 25 thereby increasing the amount of braking torque delivered to the shaft. The preloaded wave washer will continue to deflect under the applied load until a predetermined input load is reached. At this time, the pads have been retracted completely within the housing and the two load applying members are brought into arresting contact against the two radially extended end walls 22 & 21 of the housing 23. Any additional loading applied to the unit will be transmitted into relatively rigid housing rather than through the weaker shaft torquing train. As can be seen, this arrangement serves to limit the amount of braking load that can be applied to the shaft and thus prevents breakage of the unit, particularly at the weak tang section.

While this invention has been described with reference to the structure disclosed herein, it is not confined to the details set forth and this application is intended to cover any modifications or changes as may come within the scope of the following claims.

We claim:

1. A clutch brake unit for retarding the motion of the driven shaft of a clutch assembly wherein the unit is operatively engaged between two coacting members that are adapted to move into contact with the unit to apply a varying load thereto as the clutch is released from engagement with the shaft, the improvement comprising
   a pair of parallely aligned radially extended discs mounted upon the shaft for rotation therewith and being adapted to move along the shaft in an axial direction, the outer end faces of the discs being arranged to initially engage the two coacting members as the clutch is released and to compress the discs inwardly as the load increases thereby causing the motion of the shaft to be braked,
   biasing means acting between the two discs for urging them outwardly against the load applied by said coacting members, and
   a rigid stop means rotatably mounted upon said discs for engaging both coacting members upon the discs being compressed a predetermined distance whereby the amount of braking torque applied to the shaft through the disc is limited.

2. The clutch brake of claim 1 wherein the biasing means is a wave washer encircling the shaft and acting between the two inner end faces of said discs.

3. The clutch brake of claim 2 wherein said stop means is an outer housing in which the discs are contained.

4. The clutch brake of claim 3 wherein a pad is bonded to the outer end face of each disc and said pad extends outwardly from the housing beyond the end walls of the housings prior to the unit being engaged by said coacting members.

5. In a clutch brake unit of the type for retarding the motion of a driven shaft of a clutch assembly wherein the unit is positioned between a stationary member and a movable member adapted to engage the unit and apply a varying load thereto as the clutch is released, the improvement comprising
   a hub passing over the shaft and being slidably mounted thereon for rotation with the shaft,
   a pair of parallely aligned radially extended discs slidably mounted upon the hub for rotation therewith,
   a cylindrical housing rimming the outer periphery of the disc to limit their axial movement in an outward direction, the two end walls of the housing being adapted to engage said members,
   a biasing means acting between the two discs to urge the outer periphery of the discs into contact with the inner wall of the housing under a predetermined pressure,
   an annular pad supported upon the outer end face of each disc, said pads being arranged to extend outwardly in an axial direction beyond the end walls of the housing to initially engage the members and thus retard the motion of the shaft and are retracted within the housing as the load increases whereupon the members engage the end walls of the housing preventing further torquing of the shaft.

6. The clutch brake of claim 5 wherein the hub is mounted upon the shaft by means of a plurality of tangs positioned within internal splines formed in said shaft.

* * * * *